Patented Oct. 26, 1926.

1,604,309

UNITED STATES PATENT OFFICE.

HENRY L. PRESTHOLDT, OF MINNEAPOLIS, MINNESOTA.

CASEIN GLUE.

No Drawing. Application filed April 17, 1922. Serial No. 554,197.

My present invention provides a new composition of matter, herein designated as "casein glue", but which, from its broader aspect, is an adhesive composition adapted to be used by itself or commingled with other substances, as an adhesive coating.

In this improved adhesive composition, casein is used as the main adhesive base and is commingled with cassava starch, sodium fluoride, tri-sodium phosphate, calcium chloride, calcium oxide, magnesium oxide and oil. The cassava starch, in itself, becomes a strong adhesive when converted or digested in connection with an alkali.

I have obtained a very highly efficient glue or adhesive by the use of the above substances in accordance with the following formula:

| | Parts. |
|---|---|
| Casein | 50 to 75 |
| Cassava starch | 3 to 20 |
| Sodium fluoride | 1 to 10 |
| Tri-sodium phosphate | 3 to 15 |
| Calcium chloride | 1 to 6 |
| Calcium oxide | 4 to 12 |
| Magnesium oxide | 10 to 20 |
| Oil | 1 to 4 |

The above substances, except the oil, are commingled in dry powdered form and the oil commingled therewith is in such small quantity that it does not make the powdered mass pasty but keeps the same from getting into dust form. This glue has been used extensively as a binder and found very efficient as an adhesive coating. Together with a compound casein and alkaline earth, it makes a water-proof adhesive and this is a new property in glue containing cassava.

The adhesive compound is sold in dry and powdered form and, when it is to be used, it will be introduced into water to form emulsion, and it is then, of course, that the chemical reactions that develop the adhesive qualities of the composition, will take place. After these reactions have taken place, the emulsion is adapted to be used as a glue or as a coating or to be commingled with other substances, such as paint or calcimine, which contain certain color pigments. When desired, however, the color-producing pigments may be commingled with the dry composition. When the composition is to be used simply as a glue, no additions to the formula given, except water, will be required.

As an oil, I preferably use kerosene or castor oil, but oil may be omitted from the composition without changing the general character thereof.

What I claim is:

1. An adhesive composition comprising the following ingredients in approximately the proportions stated, to wit:

| | Parts. |
|---|---|
| Casein | 50 to 75 |
| Cassava starch | 3 to 20 |
| Fluoride of soda | 1 to 10 |
| Phosphate of soda | 3 to 15 |
| Chloride of calcium | 1 to 6 |
| Oxide of calcium | 4 to 12 |
| Oxide of magnesium | 10 to 20 |

2. An adhesive composition made in accordance with the following formula:

| | Parts. |
|---|---|
| Casein | 50 to 75 |
| Cassava starch | 3 to 20 |
| Sodium fluoride | 1 to 10 |
| Tri-sodium phosphate | 3 to 15 |
| Calcium chloride | 1 to 6 |
| Calcium oxide | 4 to 12 |
| Magnesium oxide | 10 to 20 |
| Oil | 1 to 4 |

In testimony whereof I affix my signature.

HENRY L. PRESTHOLDT.